United States Patent [19]

Edmondson

[11] Patent Number: 4,680,127

[45] Date of Patent: Jul. 14, 1987

[54] METHOD OF SCAVENGING HYDROGEN SULFIDE

[75] Inventor: James G. Edmondson, Conroe, Tex.

[73] Assignee: Betz Laboratories, Inc., Trevose, Pa.

[21] Appl. No.: 808,590

[22] Filed: Dec. 13, 1985

[51] Int. Cl.$^4$ ............................................. C02F 1/00
[52] U.S. Cl. ................................... 210/749; 210/916; 422/5; 423/226; 423/243
[58] Field of Search ............... 210/630, 749, 750, 757, 210/758, 916; 422/5; 423/226, 243, 563, 573 R; 424/76

[56] References Cited

U.S. PATENT DOCUMENTS

| | | | |
|---|---|---|---|
| 1,991,765 | 2/1935 | Marks | 260/17 |
| 2,426,318 | 8/1947 | Menaul | 252/8.55 |
| 2,606,873 | 8/1952 | Cardwell et al. | 252/148 |
| 3,459,852 | 8/1969 | Roehm | 424/76 |
| 3,514,410 | 5/1970 | Engle et al. | 252/87 |
| 3,585,069 | 6/1971 | Owsley | 117/127 |
| 3,669,613 | 6/1972 | Knox et al. | 21/2.7 |
| 4,083,945 | 4/1978 | Fenton et al. | 423/226 |
| 4,107,312 | 8/1978 | Wegner et al. | 424/76 |
| 4,220,550 | 9/1980 | Frenier et al. | 252/180 |
| 4,289,639 | 9/1981 | Buske | 252/87 |
| 4,310,435 | 1/1982 | Frenier | 252/180 |
| 4,501,668 | 2/1985 | Merk et al. | 210/732 |
| 4,532,117 | 7/1985 | Delaney | 210/764 |

FOREIGN PATENT DOCUMENTS

| | | | |
|---|---|---|---|
| 46-30319 | 9/1971 | Japan | 422/5 |
| 46-38280 | 11/1971 | Japan | 422/5 |

Primary Examiner—Peter Hruskoci
Attorney, Agent, or Firm—Alexander D. Ricci; Bruce E. Peacock; James D. Dee

[57] ABSTRACT

The present invention is directed to methods of reducing the amount of hydrogen sulfide in hydrogen sulfide-containing aqueous or wet gaseous mediums without solids formation. This invention comprises adding an effective amount for the purpose of glyoxal or glyoxal in combination with formaldehyde or glutaraldehyde to the desired hydrogen sulfide-containing medium.

15 Claims, No Drawings

METHOD OF SCAVENGING HYDROGEN SULFIDE

BACKGROUND OF THE INVENTION

This invention relates to methods of reducing or scavenging the amount of hydrogen sulfide in a hydrogen or sulfide-containing aqueous or wet gaseous mediums.

The reactivity between various aldehydes and sulfidic compounds ($H_2S$, mercaptans, etc.) has been known in the art for sometime. For example, Marks in U.S. Pat. No. 1,991,765 discloses a method of reacting hydrogen sulfide and an aldehyde in an aqueous solution having a pH between 2 and 12 at a temperature between substantially 20° C. and 100° C. After Marks' disclosure in 1935, many patents appeared disclosing the use of aldehydes during acid cleaning of iron sulfide deposits, including U.S. Pat. Nos. 2,606,873; 3,514,410; 3,585,069; 3,669,613; 4,220,550; 4,289,639; and 4,310,435. Consumption of the hydrogen sulfide liberated by acidification of sulfide-containing deposits increased the safety of such operations. Decreased corrosivity of the aldehyde-containing acids is also disclosed in the prior art, sometimes with the addition of ancillary corrosion inhibitors.

Menaul in U.S. Pat. No. 2,426,318 discloses a method of inhibiting the corrosive action of natural gas and oil containing soluble sulfides on metals by utilizing an aldehyde and preferably formaldehyde.

Roehm in U.S. Pat. No. 3,459,852 discloses a process for deodorizing and reducing the biochemical demand of an aqueous solution which contains at least one compound of hydrogen sulfide and compounds containing the —SH group. Roehm's process comprises mixing the solution with a sulfide-active alpha, beta unsaturated aldehyde or ketone in an amount sufficient to form sulfur-containing reaction product of the sulfide active aldehyde or ketone. More specifically, Roehm's invention resides in the use of compounds having the following alpha, beta unsaturated aldehyde or ketone moiety as the reactive portion:

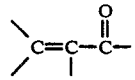

Two such sulfide-active compounds disclosed by Roehm are acrolein and 3-buten-2-one.

Formaldehye, formaldehyde with $SO_3{}^{-2}$, and acrolein are all commercially used hydrogen sulfide ($H_2S$) scavengers. However, formaldehyde produces a solid reaction product and reverts readily to formaldehyde and free $H_2S$. Acrolein is more expensive than formaldehyde as well as extremely toxic and dangerous to handle. The use of $SO_3{}^{-2}$ with formaldehyde eliminates the re-release of $H_2S$ but not solids formation.

Despite the prior art approaches to $H_2S$ scavenging, the provision of a single compound or group of compounds capable of providing the $H_2S$ scavenging funcion while not producing a solid reaction product and without stringent handling problems is highly desirable from a commercial point of view. Such a compound or compounds would provide suitable $H_2S$ scavengers for systems where solids must be avoided. These needs are effectively met by utilization of the hydrogen sulfide scavenging methods of the present invention.

DETAILED DESCRIPTION OF THE INVENTION

It has surprisingly been found that the amount of hydrogen sulfide in a hydrogen sulfide-containing aqueous medium is reduced without the formation of a solid reaction product by adding to the aqueous medium an effective amount for the purpose of a glyoxal or mixtures thereof. Glyoxal corresponds to the chemical formula

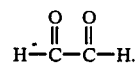

Additionally, it has been found that glyoxal functions as an effective $H_2S$ scavenger without producing a solid reaction product when the glyoxal is used in combination with formaldehyde or glutaraldehyde in an effective amount for the purpose. This is surprising since glyoxal is a di-functional analog of formaldehyde and would therefore be expected to form solid polymeric products. Furthermore, glyoxal is not a "sulfide active" carboxyl compound as defined by Roehm in U.S. Pat. No. 3,459,852. Unexpectedly, the use of glyoxal produces a soluble and relatively stable reaction product. Glyoxal approaches the $H_2S$ scavenging rate of acrolein without the constraining handling problems presented by the use of acrolein. Moreover, unlike the present invention, the use of $SO_3{}^{-2}$ with formaldehyde eliminates re-release of $H_2S$ but does not inhibit solids formation.

The glyoxal and its combination with formaldehyde or glutaraldehyde may be added to any aqueous medium containing hydrogen sulfide for which the amount of hydrogen sulfide is desired to be reduced without solids formation. It is believed that glyoxal and its mixtures may be effective for use in wet gaseous mediums containing hydrogen sulfide to reduce the amount of hydrogen sulfide without the formation of a solid reaction product by contacting the wet gaseous medium with an effective amount for the purpose of a glyoxal or its aforesaid mixtures. Wet gaseous mediums are those containing $H_2O$ in any concentration. Preferably, the aqueous or wet gaseous medium has a pH from neutral to alkaline. Glyoxal and its mixtures are suitable $H_2S$ scavengers for use in controlling sour leaks into cooling water systems, oil and gas production systems, and other similar systems.

The amount of glyoxal and mixtures thereof used in accordance with the present invention depend on the severity of the $H_2S$ problem in the medium being treated. Glyoxal-rich mixtures are desired to achieve effective $H_2S$ rapid scavenging. It is thought that the preferred amount of glyoxal to be added to the medium being treated is that amount required to provide a glyoxal:$H_2S$ molar ratio from about 1:1 to about 2.5:1. Most preferably, the glyoxal:$H_2S$ molar ratio is about 2.07:1. For mixtures of glyoxal in combination with formaldehyde or glutaraldehyde, the preferred amount to be added is that amount required to provide a glyoxal/formaldehyde or glutaraldehyde:$H_2S$ molar ratio from about 0.3:1 to about 3:1. Most preferably, the glyoxal/formaldehyde mixture has a glyoxal/formaldelhyde:$H_2S$ molar ratio of about 3:1.

The invention will be further illustrated by the following examples which are included as being illustrations of the invention and which should not be construed as limiting the scope thereof.

EXAMPLES

Hydrogen sulfide scavenger test runs were conducted in a stirred 1-liter resin kettle. A four-neck lid allowed introduction of a glass pH electrode, a specific ion electrode and a double-junction reference electrode for each. Both the pH and the mV response of the specific ion electrode were recorded continuously throughout each test run on a chart recorder. Standard conditions for all test runs were: 3.3% NaCl/0.1M NaHCO$_3$ brine, pH of about 9.0, about 100 ppm initial sulfide concentration and ambient temperature. The brine was purged with O$_2$-free N$_2$ for at least two hours before sulfide addition.

Sulfide addition to the brine was made in two increments. The first addition was about 10 ppm and the second was about 90 ppm, for a total of about 100 ppm. The mV and pH readings were noted for each addition after suitable equilibration. These values were used to calculate the electrode slope (mV/decade), which was thereafter used to calculate the sulfide concentration at various times after treatment addition. All mV readings were corrected for slight pH variations which occurred during the test runs. The corrected sulfide concentrations were then used to calculate the % reduction in sulfide for various times after treatment addition. The test runs were allowed to equilibrate overnight after treatment addition. A computer program was used to facilitate the generation of data and the error for calculation of the treatment to H$_2$S ratios is estimated to be less than 10% in the majority of test runs reported in Tables I, II, and III below. However, for the results reported in Table IV, the exact solution volume of each test run was used to calculate the treatment concentration and more accurate ratios are reported in Table IV.

The results obtained for glyoxal, acrolein, formaldehyde and glutaraldehyde with each tested separately are reported in Table I.

TABLE I

| Treatment | Aldehyde:H$_2$S Molar Ratio | Time (mins.) | % Red. in H$_2$S |
|---|---|---|---|
| Glyoxal (1 run) | 2.1:1 | 0 | 0 |
| | | 7 | 39.5 |
| | | 20 | 56.6 |
| | | 74 | 86.5 |
| | | 1039 | 96.1 |
| Acrolein (2 runs) | 2.2:1 | 0 | 0 |
| | | 2 | 64.8 |
| | | 8 | 85.8 |
| | | 38 | 88.3 |
| | | 75 | 97.7 |
| | | 133 | 98 |
| | | 1005 | 97.3 |
| | | 1165 | 99.7 |
| Formaldehyde (1 run) | 2.0:1 | 0 | 0 |
| | | 7.9 | 27.8 |
| | | 19.9 | 47.3 |
| | | 61.9 | 36.3 |
| | | 1030 | 34.9 |
| Formaldehyde (1 run) | 4.2:1 | 0 | 0 |
| | | 10 | 33.3 |
| | | 20 | 45.5 |
| | | 86 | 33.3 |
| | | 160 | 25.9 |
| | | 284 | 19.6 |

TABLE I-continued

| Treatment | Aldehyde:H$_2$S Molar Ratio | Time (mins.) | % Red. in H$_2$S |
|---|---|---|---|
| | | 1475 | 16.4 |
| Glutaraldehyde (1 run) | 0.4:1 | 0 | 0 |
| | | 38 | 18.4 |
| | | 53 | 24.3 |
| | | 148 | 41.2 |
| | | 1157 | 50.2 |

The results reported in Table I indicate that acrolein exhibits the fastest rate of reaction with H$_2$S. However, these results also show that glyoxal is a very rapid H$_2$S scavenger and eventually attains about the same effectiveness of acrolein. The results in Table I further indicate that formaldehyde and glutaraldehyde are considerably less effective H$_2$S scavengers. Glyoxal, acrolein and glutaraldehyde were not observed to form solid reaction products. Solids were observed to precipitate after four hours when formaldehyde was used.

Glyoxal, acrolein, formaldehyde and glutaraldehyde were also tested as H$_2$S scavengers in the presence of SO$_3$$^{-2}$ and the results are reported in Table II with each tested separately.

TABLE II

| Treatment | Aldehyde:H$_2$S Molar Ratio | Time (mins) | % Red. in H$_2$S |
|---|---|---|---|
| Glyoxal/461 ppm SO$_3$$^{-2}$ (1 run) | 2.1:1 | 0 | 0 |
| | | 5 | 0 |
| | | 10 | 4 |
| | | 25 | 15.5 |
| | | 145 | 27 |
| | | 981 | 93.9 |
| Acrolein/100 ppm SO$_3$$^{-2}$ (2 runs) | 2.2:1 | 0 | 0 |
| | | 2 | 61.1 |
| | | 3 | 56.5 |
| | | 5 | 72.7 |
| | | 11 | 72.1 |
| | | 73 | 85.8 |
| | | 77 | 87.6 |
| | | 229 | 90.3 |
| | | 273 | 90.7 |
| | | 1245 | 94.7 |
| | | 1312 | 95.7 |
| Formaldehyde/100 ppm SO$_3$$^{-2}$ (1 run) | 4.2:1 | 0 | 0 |
| | | 60 | 37.5 |
| | | 120 | 44.1 |
| | | 360 | 62.6 |
| | | 1380 | 68.1 |
| Glutaraldehyde/100 ppm SO$_3$$^{-2}$ (1 run) | 0.4:1 | 0 | 0 |
| | | 15 | 9.3 |
| | | 51 | 17.0 |
| | | 216 | 48.6 |
| | | 1070 | 45.6 |

The re-release of H$_2$S by formaldehyde is inhibited by the presence of SO$_3$$^{-2}$ as shown in Table II. Solids were observed in the formaldehyde test run after four hours. For glyoxal, acrolein and glutaraldehyde, the results in Table II show that SO$_3$$^{-2}$ reduces scavenging efficiency (rate) and/or effectiveness (maximum amount scavenged) to varying degrees. Solids were not produced for these three aldehydes during the test runs.

A comparison of the H$_2$S scavenging performance of glyoxal, glyoxal in combination with formaldehyde, and glyoxal in combination with glutaraldehyde was conducted and the results are reported in Table III. For each test run in Table III, the total aldehyde:H$_2$S molar ratio used was about 2.2, with the mixtures containing about equal molar amounts of each aldhyde.

Observations for the H$_2$S scavenger test runs in Table IV are reported in Table V.

TABLE V

| Treatment | Corrected Ratio | H$_2$S Odor | Color | Solids | Lead Acetate Paper[1] |
|---|---|---|---|---|---|
| Glyoxal | 2.07:1 | No | Dk. Ylw | No | White |
| Glyoxal/Formaldehyde | 1.50/0.50:1 | Slight | Md. Ylw | No | Lt. Brn |
| Glyoxal/Formaldehyde | 0.99/0.99:1 | Slight | Lt. Ylw | No | Lt. Brn |
| Glyoxal/Formaldehyde | 0.51/1.52:1 | Strong | Faint Ylw | No | Dk. Brn |
| Formaldehyde | 2.00:1 | Yes | — | Wht Floc | — |
| Glyoxal | 1.03:1 | Yes | Dk. Ylw | No | Dk. Brn |

[1]Wet lead acetate paper held above the test solution, this paper turns brown (PbS) upon contact with H$_2$S.

TABLE III

| Treatment | Time (mins.) | % Red. in H$_2$S |
|---|---|---|
| Glyoxal (1 run) | 0 | 0 |
| | 7 | 39.5 |
| | 20 | 56.6 |
| | 74 | 86.5 |
| | 1039 | 96.1 |
| Glyoxal/Formaldehyde (1 run) | 0 | 0 |
| | 5 | 13.8 |
| | 15 | 26.7 |
| | 32 | 44.6 |
| | 1007 | 93.1 |
| Glyoxal/Glutaraldehyde (1 run) | 0 | 0 |
| | 5 | 18.8 |
| | 10 | 18.8 |
| | 45 | 51.3 |
| | 158 | 82.4 |
| | 1049 | 95.8 |

Surprisingly, the glyoxal/formaldehyde mixture reported in Table III was observed to be effective without solids formation or H$_2$S re-release.

Additional test runs were conducted to better characterize the H$_2$ reactivity of glyoxal and its mixtures and the results are reported in Table IV.

TABLE IV

| Treatment | Ratio of Sample H$_2$S | Time (mins.) | % Red. in H$_2$S |
|---|---|---|---|
| Glyoxal | 2.07:1 | 0 | 0 |
| | | 11.8 | 35.8 |
| | | 26.8 | 75.5 |
| | | 61.8 | 95.8 |
| | | 241.8 | 98.8 |
| | | 965 | 99.0 |
| Glyoxal/Formaldehyde | 1.50/0.50:1 | 0 | 0 |
| | | 6.7 | 58.2 |
| | | 16.1 | 75.3 |
| | | 76.1 | 97.5 |
| | | 1020 | 98.6 |
| Glyoxal/Formaldehyde | 0.99/0.99:1 | 0 | 0 |
| | | 2 | 13.3 |
| | | 8.8 | 18.0 |
| | | 62.8 | 48.4 |
| | | 970 | 81.3 |
| Glyoxal/Formaldehyde | 0.51/1.52:1 | 0 | 0 |
| | | 2.5 | 7.8 |
| | | 14.5 | 21.0 |
| | | 80.5 | 54.8 |
| | | 1028 | 87.2 |
| Formaldehyde | 2.00:1 | 0 | 0 |
| | | 7.9 | 27.8 |
| | | 19.9 | 47.3 |
| | | 61.9 | 36.3 |
| | | 1030 | 34.9 |
| Glyoxal | 1.03:1 | 0 | 0 |
| | | 2 | 19.3 |
| | | 62 | 90 |
| | | 122 | 97.3 |
| | | 1031 | 98.3 |

The results reported in Table IV indicate that glyoxal-rich mixtures are desired to achieve effective H$_2$S rapid scavenging.

Field tests were also conducted at an oil production test well and a gas production system for an evaluation of glyoxal as an H$_2$S scavenger. The results from these field tests showed rapid and significant initial reductions in H$_2$S concentration for the natural gas, crude oil, and produced water phases. However, a gradual liberation of H$_2$S from the glyoxal treated waters occurred. But at both the oil production test well and the gas production system, the water pH was acidic and in the 4.5 to 5.5 range. It is believed that the application of heat and/or sparging to these treated waters was sufficient to cause release of H$_2$S. It is further believed that at acidic pH values, the glyoxal/H$_2$S reaction product is in equilibrium with dissolved H$_2$S. But at a pH of about 9, the predominant sulfide species is the non-volatile HS$^-$ ions. Thus, it is thought that higher temperature, low pH or gas sparging increase the volatility of H$_2$S from solution. This, in turn, results in decomposition of the reaction product to glyoxal and H$_2$S (or HS$^-$) in order to maintain equilibrium.

I claim:

1. A method for reducing the amount of hydrogen sulfide in a hydrogen sulfide-containing aqueous medium without solids formation, wherein said aqueous medium has a pH from neutral to alkaline, which method comprises adding to the aqueous medium an effective amount for the purpose of a glyoxal.

2. A method according to claim 1, wherein said glyoxal is added in an amount to provide a glyoxal:hydrogen sulfide molar ratio from about 1:1 to about 2.5:1.

3. A method according to claim 1, wherein said glyoxal is added in an amount to provide a glyoxal:hydrogen sulfide molar ratio of about 2.07:1.

4. A method according to claim 1, wherein said aqueous medium has a pH of about 9.

5. A method according to claim 1, wherein the addition is conducted at ambient temperature.

6. A method for reducing the amount of hydrogen sulfide in a hydrogen sulfide-containing aqueous medium without the formation of a solid reaction product, wherein said aqueous medium has a pH from neutral to alkaline, which method comprises adding to the aqueous medium an effective amount for the purpose of a glyoxal and a formaldehyde in combination, wherein said glyoxal and said formaldehyde are each added in an amount to provide a glyoxal/formaldehyde:hydrogen sulfide molar ratio from about 0.3:1 to about 3:1.

7. A method according to claim 6, wherein said glyoxal and said formaldehyde are added in an amount to provide a glyoxal/formaldehyde:hydrogen sulfide molar ratio of about 3:1.

8. A method according to claim 6, wherein said aqueous medium has a pH of about 9.

9. A method according to claim 6 wherein the addition is conducted at ambient temperature.

10. A method for reducing the amount of hydrogen sulfide in a hydrogen sulfide-containing aqueous medium without the formation of a solid reaction product, wherein said aqueous medium has a pH from neutral to alkaline, which method comprises adding to the aqueous medium an effective amount for the purpose of a glyoxal and a glutaraldehyde in combination, wherein said glyoxal and said glutaraldehyde are each added in an amount to provide a glyoxal/glutaraldehyde:hydrogen sulfide molar ratio from about 0.3:1 to about 3:1.

11. A method according to claim 10, wherein said aqueous medium has a pH of about 9.

12. A method according to claim 10, wherein the addition is conducted at ambient temperature.

13. A method for reducing the amount of hydrogen sulfide in a hydrogen sulfide-containing wet gaseous aqueous medium without the formation of a solid reaction product, wherein said aqueous medium has a pH from neutral to alkaline, which method comprises contacting said wet gaseous medium with an effective amount for the purpose of a glyoxal.

14. A method according to claim 13, wherein said glyoxal is added in amount to provide a glyoxal:hydrogen sulfide molar ratio from about 1:1 to about 2.5:1.

15. A method according to claim 13, wherein said contacting is conducted at ambient temperature.

* * * * *